(12) United States Patent
Nishikawa

(10) Patent No.: US 9,451,107 B2
(45) Date of Patent: *Sep. 20, 2016

(54) MULTI-FUNCTION APPARATUS

(71) Applicant: Brother Kogyo Kabushiki Kaisha, Nagoya-shi, Aichi-ken (JP)

(72) Inventor: Yasuo Nishikawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,970

(22) Filed: Nov. 16, 2015

(65) Prior Publication Data

US 2016/0072974 A1 Mar. 10, 2016

Related U.S. Application Data

(63) Continuation of application No. 14/320,612, filed on Jun. 30, 2014, now Pat. No. 9,191,533, which is a continuation of application No. 14/108,303, filed on Dec. 16, 2013, now Pat. No. 8,767,231, which is a continuation of application No. 12/890,414, filed on Sep. 24, 2010, now Pat. No. 8,610,910.

(30) Foreign Application Priority Data

Sep. 28, 2009 (JP) ................................. 2009-223484

(51) Int. Cl.
*H04N 1/04* (2006.01)
*H04N 1/00* (2006.01)
(Continued)

(52) U.S. Cl.
CPC .......... *H04N 1/00554* (2013.01); *G03G 21/16* (2013.01); *H04N 1/00278* (2013.01);
(Continued)

(58) Field of Classification Search
USPC ....... 358/1.13, 497, 296; 399/110, 114, 122, 399/126
See application file for complete search history.

(56) References Cited

U.S. PATENT DOCUMENTS 6,510,301 B2 1/2003 Tanaka
8,379,278 B2 2/2013 Kawai
(Continued)

FOREIGN PATENT DOCUMENTS

CN 101232552 A 7/2008
CN 101237504 A 8/2008
(Continued)

OTHER PUBLICATIONS

The State Intellectual Property Office of the People's Republic of China, Notification of First Office Action for Chinese Patent Application No. 201010290548.6 (related to U.S. Pat. No. 8,767,231 B2), issued Sep. 10, 2012.
(Continued)

*Primary Examiner* — Vu B Hang
(74) *Attorney, Agent, or Firm* — Baker Botts L.L.P.

(57) ABSTRACT

A multi-function apparatus includes a body, an image reading unit, a document cover and a locking member. The image reading unit is movable between a closed position and an opened position. The document cover is movable between a closed position and an opened position. The locking member is movable to a first position and a second position and includes a first engagement portion and a second engagement portion. In response to a movement of the document cover to the opened position, the locking member moves to the first position and locks the image reading unit to the closed position. In response to a movement of the image reading unit to the opened position, the locking member moves to the second position and locks the document cover to the closed position.

12 Claims, 12 Drawing Sheets

(51) Int. Cl.
*G03G 21/16* (2006.01)
*G06F 3/12* (2006.01)
*G06K 15/00* (2006.01)
*H04N 1/193* (2006.01)
*H04N 1/10* (2006.01)

(52) U.S. Cl.
CPC ...... *H04N1/00519* (2013.01); *H04N 1/00557* (2013.01); *H04N 1/00559* (2013.01); *G03G 2221/1609* (2013.01); *G03G 2221/1678* (2013.01); *G03G 2221/1684* (2013.01); *G06F 3/1296* (2013.01); *G06K 15/00* (2013.01); *H04N 1/1017* (2013.01); *H04N 1/193* (2013.01); *H04N 2201/0081* (2013.01); *H04N 2201/0082* (2013.01); *H04N 2201/0094* (2013.01)

(56) References Cited

U.S. PATENT DOCUMENTS

| | | | |
|---|---|---|---|
| 9,191,533 B2 * | 11/2015 | Nishikawa | H04N 1/00519 |
| 2002/0061212 A1 | 5/2002 | Tanaka | |
| 2007/0195381 A1 | 8/2007 | Yamazaki et al. | |
| 2007/0196128 A1 | 8/2007 | Ishihara et al. | |
| 2008/0062448 A1 | 3/2008 | Saito | |
| 2008/0175620 A1 | 7/2008 | Ohta et al. | |
| 2008/0180760 A1 | 7/2008 | Andoh et al. | |
| 2008/0180762 A1 | 7/2008 | Andoh et al. | |
| 2008/0181695 A1 | 7/2008 | Andoh et al. | |
| 2008/0181698 A1 | 7/2008 | Andoh et al. | |
| 2008/0291501 A1 | 11/2008 | Shiraki et al. | |
| 2008/0310898 A1 | 12/2008 | Jo et al. | |
| 2008/0317498 A1 | 12/2008 | Andoh et al. | |

FOREIGN PATENT DOCUMENTS

| | | |
|---|---|---|
| EP | 2006745 A2 | 12/2008 |
| JP | S55-153949 A | 12/1980 |
| JP | H11-084983 A | 3/1999 |
| JP | 2001-242563 A | 9/2001 |
| JP | 2005-210391 A | 8/2005 |
| JP | 2006-042003 A | 2/2006 |
| JP | 2007-079375 A | 3/2007 |
| JP | 2007-225795 A | 9/2007 |
| JP | 2008-053883 A | 3/2008 |
| JP | 2009-037187 A | 2/2009 |
| JP | 2009-038787 A | 2/2009 |
| JP | 2009-069674 A | 4/2009 |
| JP | 2009-157064 A | 7/2009 |

OTHER PUBLICATIONS

Japan Patent Office, Notice of Reasons for Rejection for Japanese Patent Application No. 2009-223484 (related to U.S. Pat. No. 8,767,231 B2), mailed Feb. 26, 2013.

Japan Patent Office, Notice of Reasons for Rejection for Japanese Patent Application No. 2013-124411 (counterpart to co-pending U.S. Appl. No. 14/320,612), mailed Sep. 2, 2014.

* cited by examiner

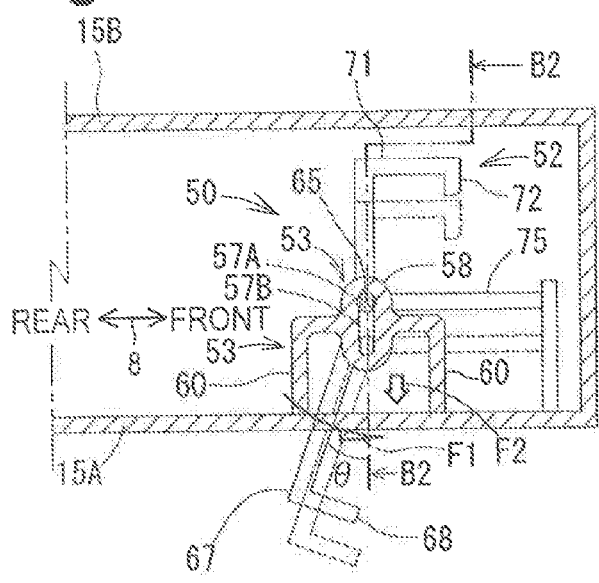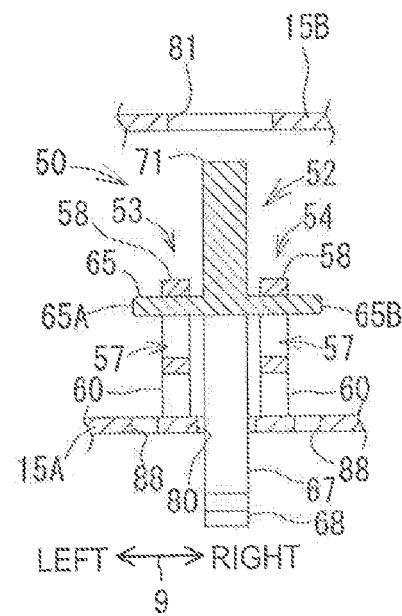

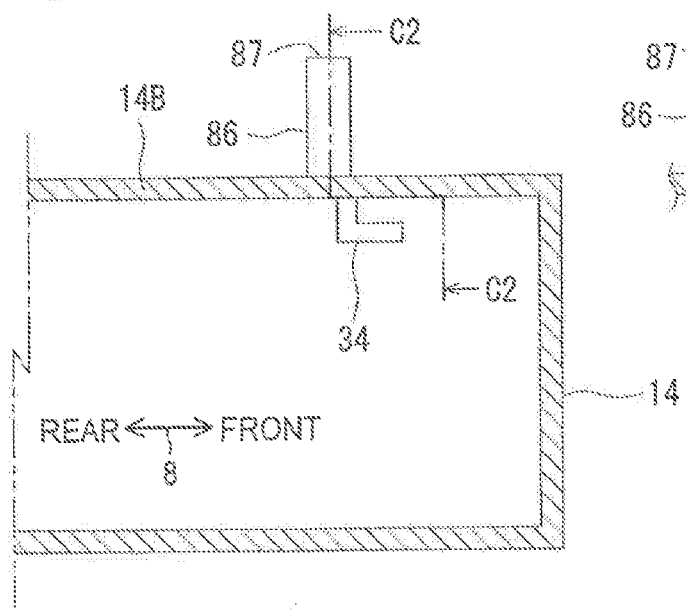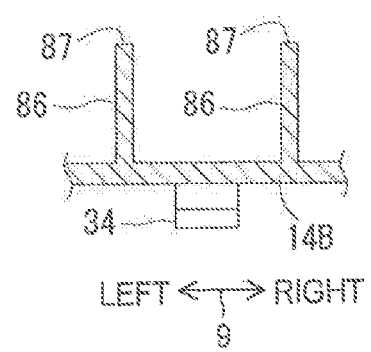

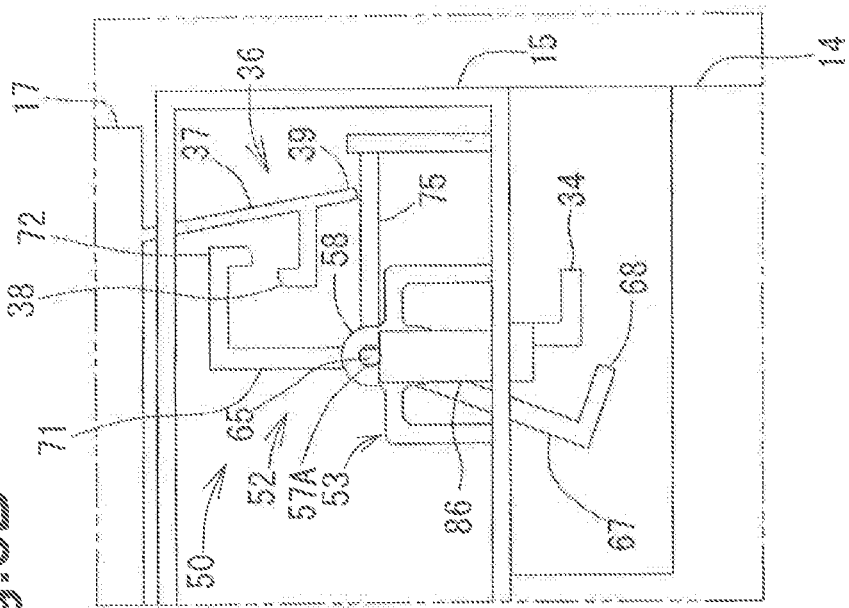
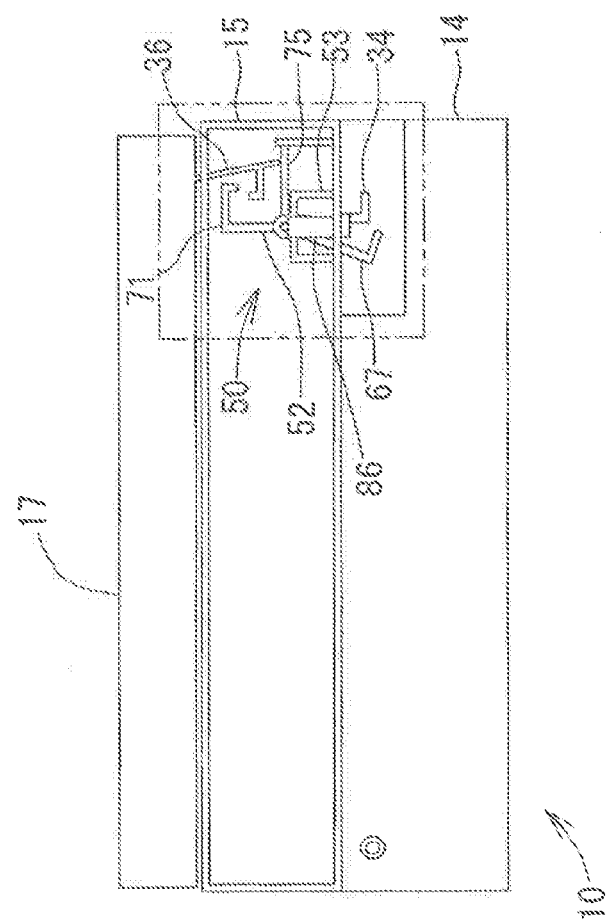

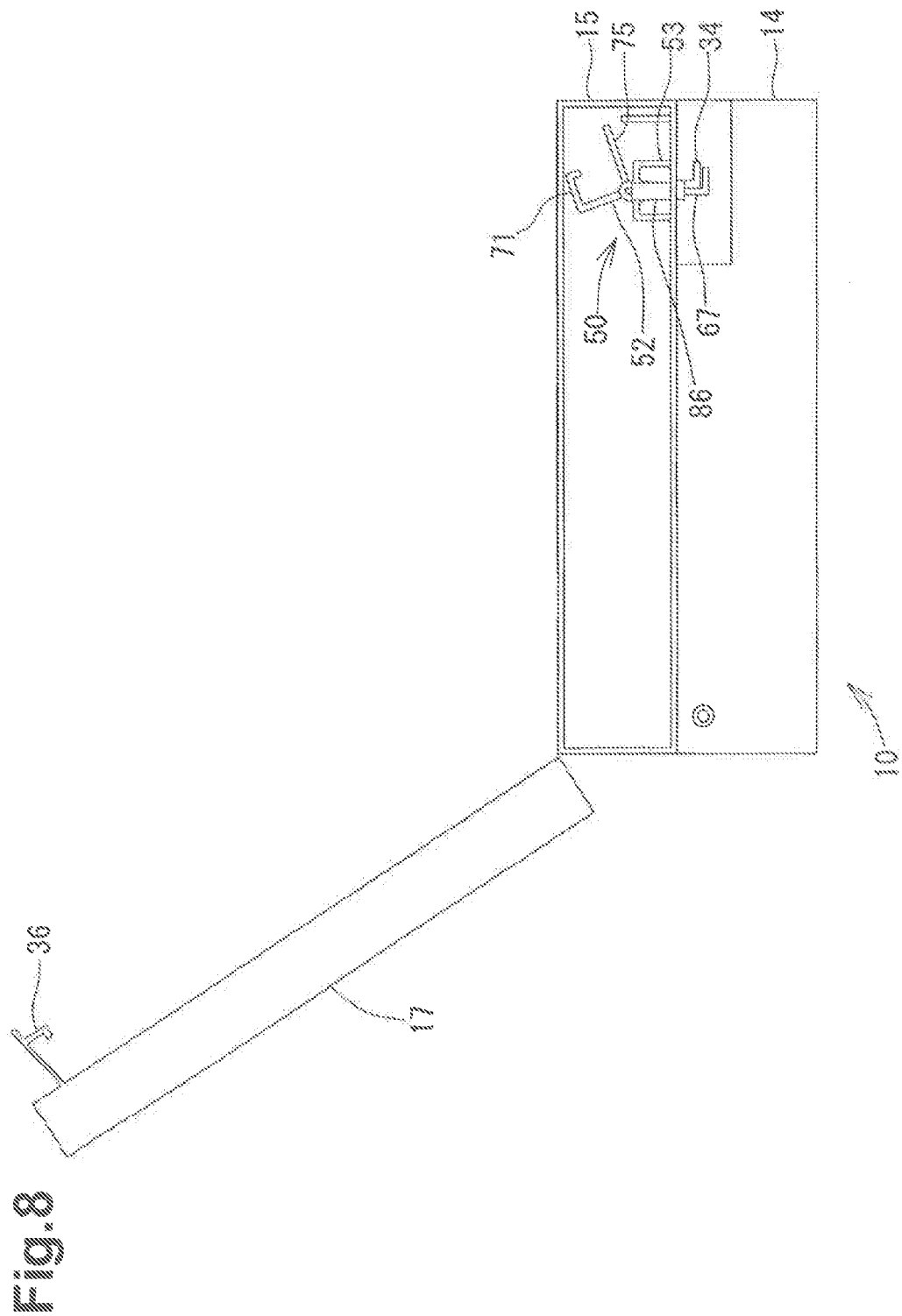

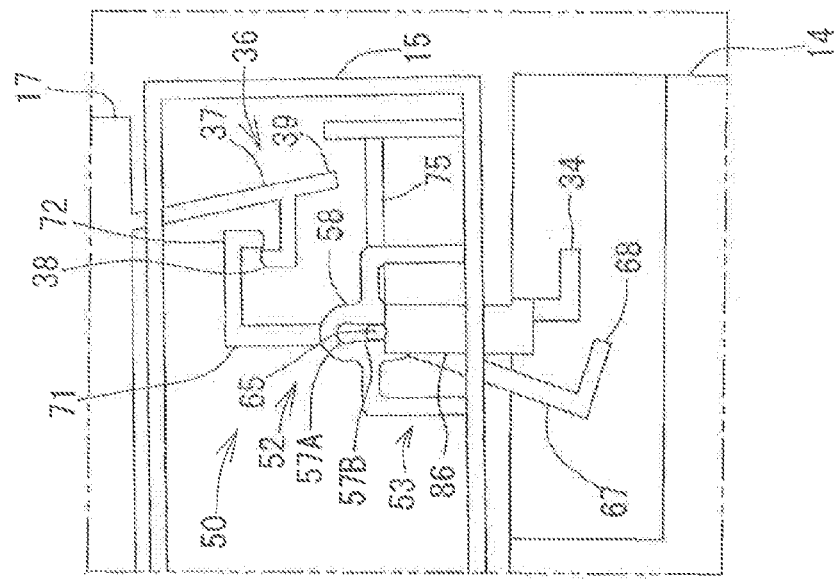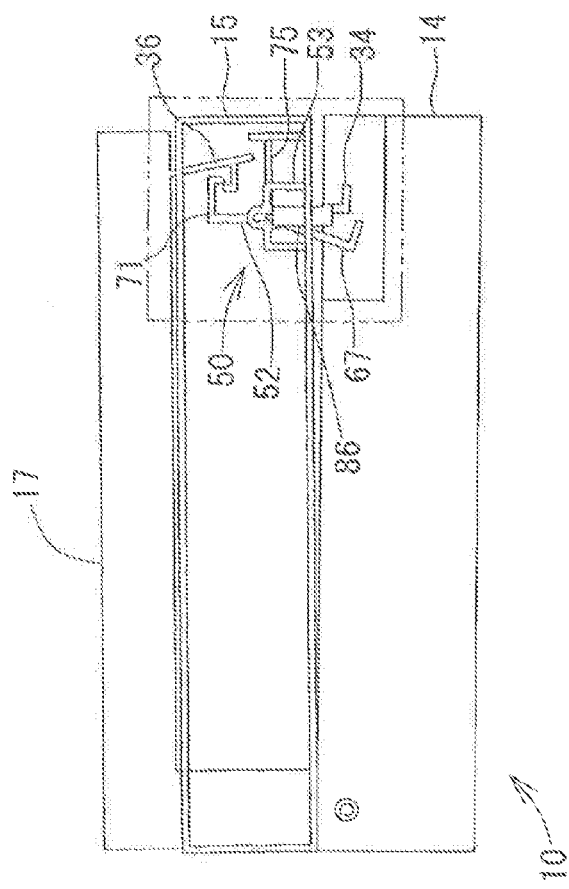

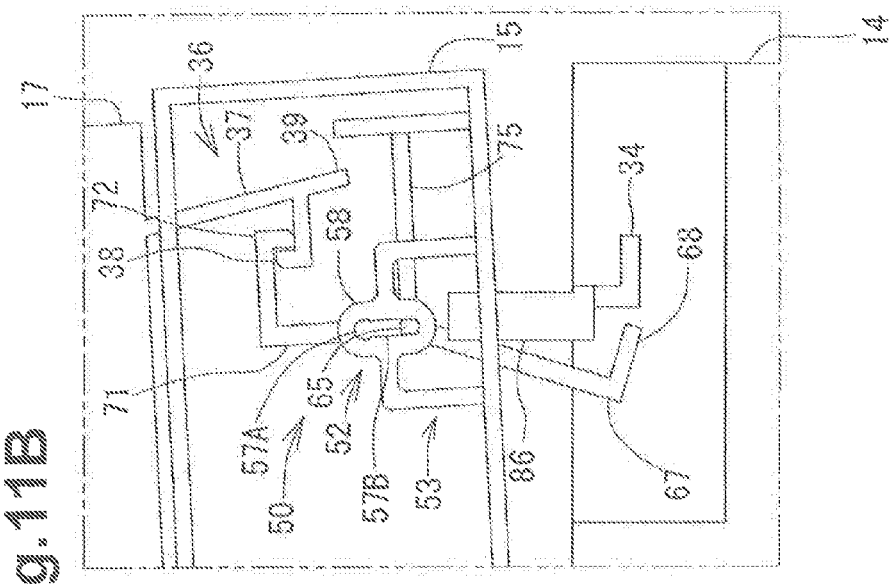
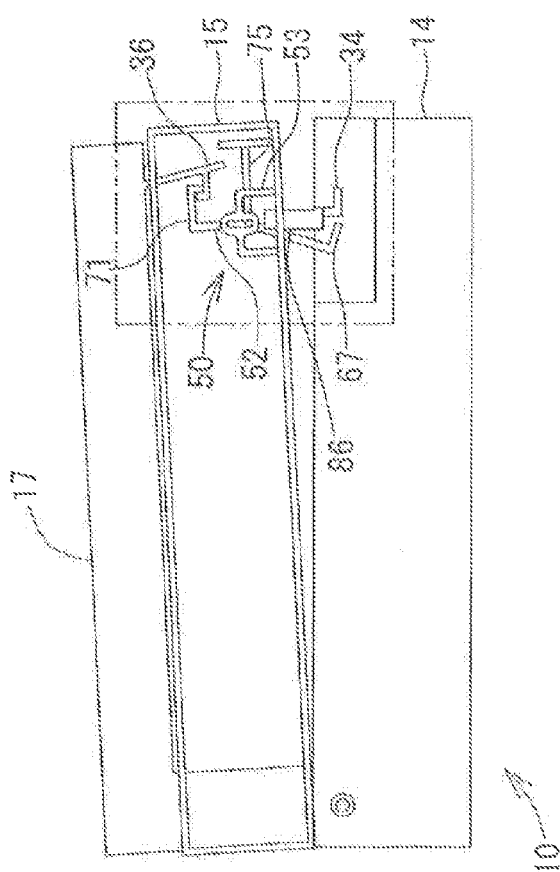
Fig.11A
Fig.11B

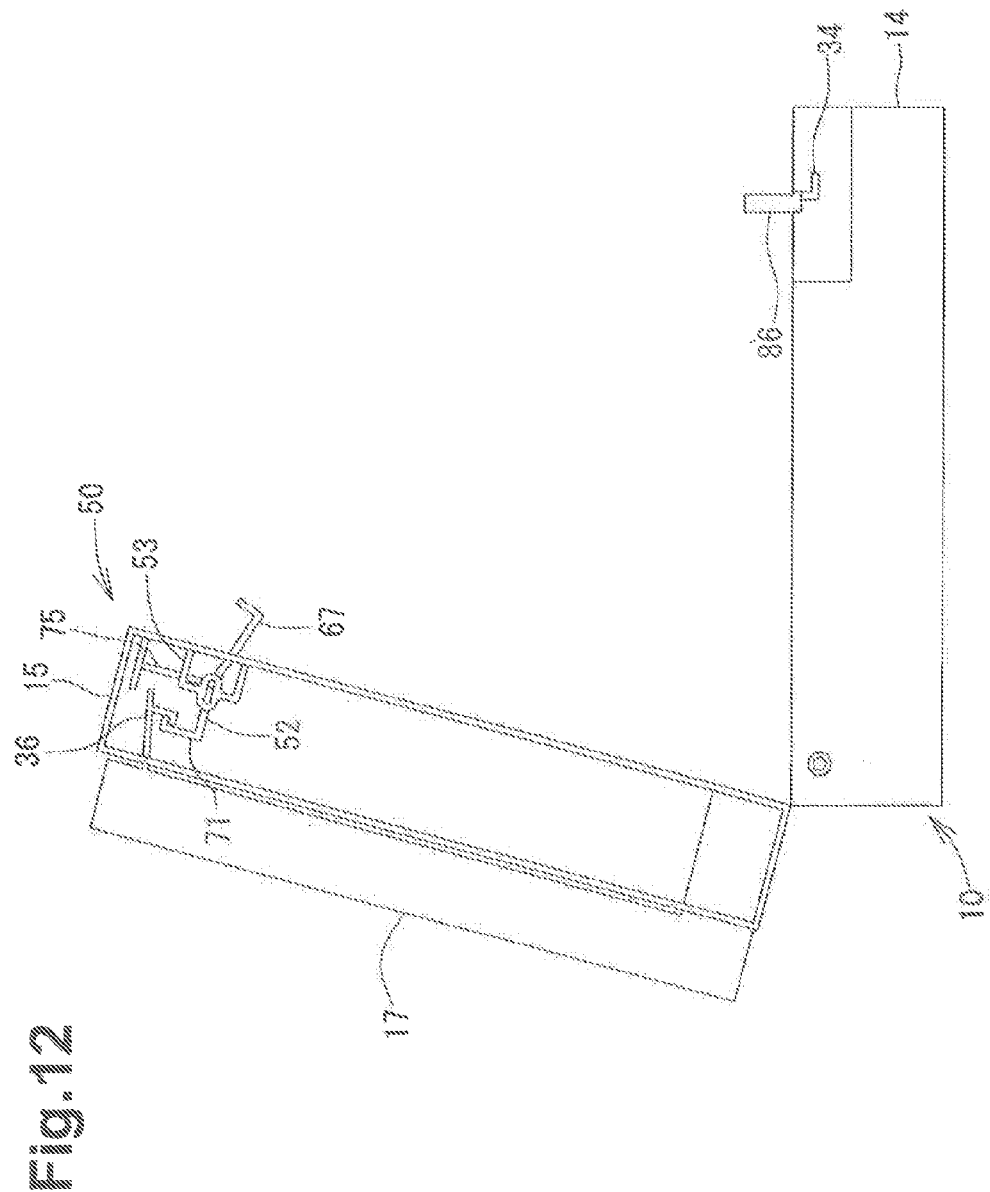

MULTI-FUNCTION APPARATUS

CROSS REFERENCE TO RELATED APPLICATION

This application is a continuation of U.S. patent application Ser. No. 14/320,612, filed on Jun. 30, 2014, which is a continuation of U.S. patent application Ser. No. 14/108,303, filed on Dec. 16, 2013, now U.S. Pat. No. 8,767,231 B2, issued on Jul. 1, 2014, which is a continuation of U.S. patent application Ser. No. 12/890,414, filed on Sep. 24, 2010, now U.S. Pat. No. 8,610,910 B2, issued on Dec. 17, 2013, which claims the benefit of Japanese Patent Application No. 2009-223484, which was filed on Sep. 28, 2009, the disclosures of which are incorporated herein by reference in their entirety.

BACKGROUND

1. Field of the Invention

The present invention relates to a multi-function apparatus having a document cover, an image reading unit.

2. Description of the Related Art

A multi-function apparatus including a document cover and an image reading unit is known. The multi-function apparatus includes a first locking member which locks the document cover to the image reading unit, and a second locking member which locks the image reading unit to the printer housing. This configuration prevents the document cover and the scanner housing from opening simultaneously for the sake of security.

SUMMARY

Since the multi-function apparatus has two locking members, a locking unit becomes larger in size and the apparatus also becomes larger in size. In addition, a locking mechanism in the lock unit comes to be complicated.

A need has arisen to provide a multi-function apparatus having a space-saving and safe locking mechanism that is formed with fewer components.

According to an embodiment of the present invention, a multi-function apparatus includes a body, an image reading unit, a document cover and a locking member. The image reading unit has a document placing surface and is configured to read an image of a document placed on the document placing surface. The image reading unit is movable between a closed position to cover an upper portion of the body and an opened position to open the upper portion. The document cover is movable between a closed position to cover the document placing surface and an opened position to open the document placing surface. The locking member is movable to a first position and a second position and includes a first engagement portion capable of engaging with the body and a second engagement portion capable of engaging with the document cover. When the locking member is in the first position, the first engagement portion prevents the image reading unit from moving from the closed position to the opened position by engaging with the body. When the locking member is in the second position, the second engagement portion prevents the document cover from moving from the closed position to the opened position by engaging with the document cover. Furthermore, in response to a movement of the document cover to the opened position, the locking member moves to the first position and locks the image reading unit to the closed position. In response to a movement of the image reading unit to the opened position, the locking member moves to the second position and locks the document cover to the closed position.

BRIEF DESCRIPTION OF THE DRAWINGS

FIG. 3A schematically and separately illustrates a cross-sectional structure of a scanner housing taken along a line II-II in FIG. 1.

FIG. 3B schematically and separately illustrates a cross-sectional structure of the scanner housing taken along a line II-II in FIG. 1.

FIG. 4A schematically and separately illustrates a cross-sectional structure of a printer housing taken along a line II-II in FIG. 1.

FIG. 4B schematically and separately illustrates a cross-sectional structure of the printer housing taken along a line II-II in FIG. 1.

FIG. 5A is a cross-sectional view schematically illustrating a locking mechanism under the operation in which the document cover is being opened.

FIG. 5B is a cross-sectional view schematically illustrating the locking mechanism under the operation in which the document cover is being opened.

FIG. 8 is a cross-sectional view schematically illustrating the document cover being in a fully open state.

FIG. 10A is a cross-sectional view schematically illustrating the locking mechanism under the operation in which the scanner housing is being opened.

FIG. 10B is a cross-sectional view schematically illustrating the locking mechanism under the operation in which the scanner housing is being opened.

FIG. 11A is a cross-sectional view schematically illustrating the locking mechanism under the operation in which the scanner housing is being opened.

FIG. 11B is a cross-sectional view schematically illustrating the locking mechanism under the operation in which the scanner housing is being opened.

FIG. 12 is a cross-sectional view schematically illustrating the scanner housing being in a fully open state.

DESCRIPTION OF THE PREFERRED EMBODIMENTS

Embodiments of the invention will be hereinafter described with appropriate reference to the accompanying drawings. The embodiments described below are merely examples of the invention, and obviously, the embodiments can be suitably modified without departing from the scope of the invention.

Figure 1:
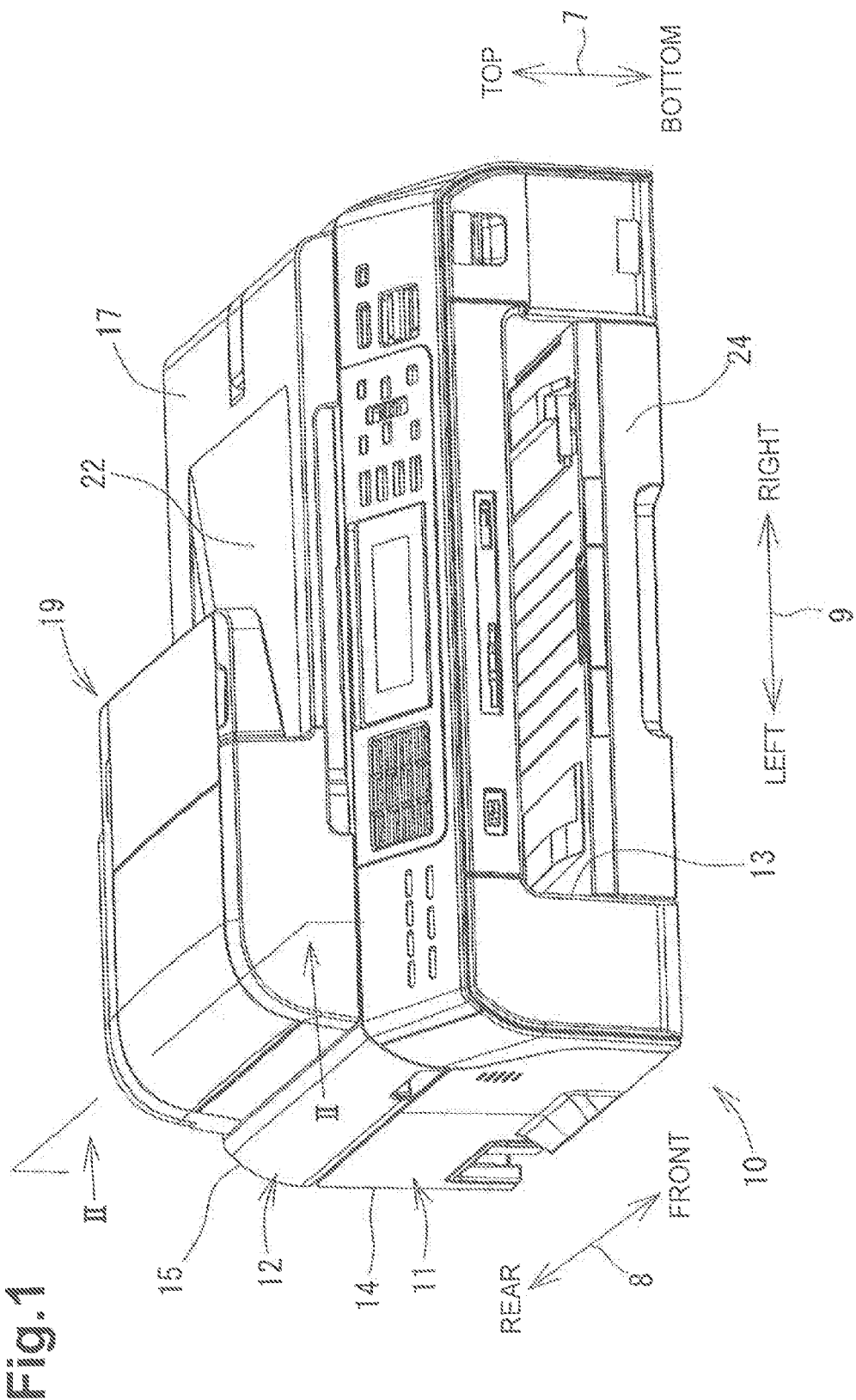
FIG. 1 is a perspective view illustrating the appearance of a multifunctional apparatus as an example according to an embodiment of the invention.

FIG. 1 is a perspective view illustrating the appearance of a multifunctional apparatus 10 according to an embodiment of the invention. In the following description, a vertical direction 7 is defined on the basis of a state in which the multifunctional apparatus 10 is installed so as to be able to be used (state in FIG. 1), and a longitudinal direction 8 is defined on the basis that a side on which an opening 13 is formed is a foreside (front side), and a lateral direction 9 is defined on the basis of viewing the apparatus 10 from the foreside (front side).

The multifunctional apparatus 10 is an example of the multi-function apparatus. As illustrated in FIG. 1, the multifunctional apparatus 10 is generally formed in a thin rectangular-parallelepiped shape in which a width (length in the lateral direction 9) and a depth (length in the longitudinal direction 8) are larger than a height (length in the vertical direction 7). The multifunctional apparatus 10 has various functions including a facsimile function, a printer function, a scanner function, and a copy function. The multi-function apparatus is not limited to one having all of the above functions and, for example, may be applied to a multifunctional apparatus having only the printer function and the scanner function or to a copier having only the copy function. Furthermore, the multi-function apparatus may be applied to a multifunctional apparatus having some function besides the printer function.

An ink jet printer 11 is disposed in a lower portion of the multifunctional apparatus 10. The printer 11 has a printer housing 14 (an example of a body) which is provided with the opening 13 in the front side thereof. A tray 24 is disposed in the opening 13 and serves to accommodate recording paper. The printer 11 is not limited to an ink jet type of printer, and an electrophotographic printing technique or a thermal transfer printing technique may be employed.

The scanner 12 is disposed on the printer 11. The scanner 12 has a scanner housing 15 (an example of an image reading unit) which is provided with contact glass (not illustrated) on an upper surface thereof. A document having an image to be scanned is placed on an upper surface of the contact glass (corresponding to a document placing surface).

The scanner housing 15 is supported by a supporting mechanism, such as a hinge, on the back side of the multifunctional apparatus 10 so as to be openable and closeable with respect to an upper surface of the printer housing 14. By virtue of this configuration, the scanner housing 15 is capable of being rotated between a closed position in which the scanner housing 15 covers the upper portion of the printer housing 14 (position illustrated in FIGS. 1, 5A, and 5B) and an opened position in which the scanner housing 15 is moved away from the upper portion of the printer housing 14 in the upward direction (position illustrated in FIGS. 11A, 11B, and 12). In the embodiment, the upper portion of the printer housing 14 is in an open state. Therefore, in cases where the scanner housing 15 is lifted to reveal the upper portion of the printer housing 14 as illustrated in FIG. 12, users are capable of accessing the inside of the apparatus from the upper portion of the printer housing 14. Consequently, users are capable of performing maintenance of components in the printer 11 and removing paper jam. As described above, the scanner housing 15 serves as a cover that covers the upper portion of the printer housing 14.

The scanner 12 includes a document cover 17 (an example of a document cover) that covers a document placed on the contact glass. The document cover 17 is supported by a supporting mechanism, such as a hinge, on a back side of the multifunctional apparatus 10 so as to be able to be openable and closeable with respect to the contact glass disposed on the upper surface of the scanner housing 15. By virtue of this configuration, the document cover 17 is capable of being rotated between a closed position in which the document cover 17 covers the upper surface of the contact glass (position illustrated in FIGS. 1, 5A, and 5B) and an opened position in which the document cover 17 is moved away from the upper surface of the contact glass in the upward direction (position illustrated in FIGS. 7A, 7B, and 8).

The document cover 19 includes an auto document feeder (ADF) 19. The ADF 19 picks up a plurality of documents placed at a predetermined position one at a time, transports the documents through a scanning position on the contact glass, and then ejects the documents to a document ejection section 22.

The multifunctional apparatus 10 includes a locking mechanism 50. The locking mechanism 50 is disposed at a front portion in the multifunctional apparatus 10. The locking mechanism 50 has a function with which the scanner housing 15 is engaged with the printer housing 14 to be locked thereto and has a function with which the scanner housing 15 is engaged with the document cover 17 to be locked thereto.

[Locking Mechanism 50]

Figure 2:
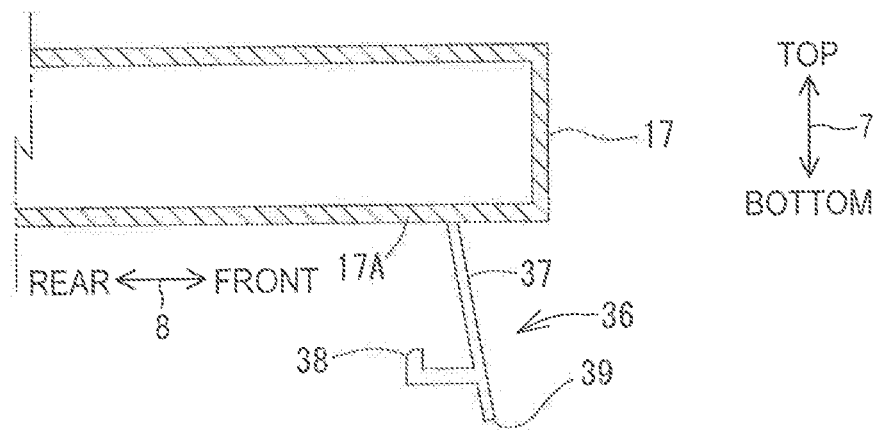
FIG. 2 schematically and separately illustrates a cross-sectional structure of a document cover taken along a line II-II in FIG. 1.

With reference to FIGS. 2A to 4B, the locking mechanism 50 includes a rotating body 52 (an example of a locking member) and a pair of supporting sections 53 and 54 (an example of a supporting portion, see FIG. 3B). FIG. 2 is a cross-sectional view schematically illustrating the document cover 17. FIG. 3A is a cross-sectional view schematically illustrating the scanner housing 15. FIG. 3B is a cross-sectional view schematically illustrating the scanner housing 15 taken along a line IIC-IIC in FIG. 3A. FIG. 4A is a cross-sectional view schematically illustrating the printer housing 14. FIG. 4B is a cross-sectional view schematically illustrating the printer housing 14 taken along a line IIE-IIE in FIG. 4A. In FIGS. 3A and 3B, for the purpose of simplifying the description, a shaft 65 is illustrated so as to be positioned at the leading end of a slot 57.

The supporting sections 53 and 54 are disposed inside the scanner housing 15. The supporting sections 53 and 54 are vertically disposed on a lower wall 15A of the scanner housing 15. With reference to FIG. 3B, the supporting sections 53 and 54 are disposed so as to be spaced at predetermined intervals in the lateral direction 9. The supporting section 53 includes a supporting portion 58 having the slot 57 extending in the vertical direction 7 and penetrating in the lateral direction 9 and includes an arch-shaped leg 60 extending toward the lower wall 15A from both sides of the supporting portion 58 in the longitudinal direction 8. Because the supporting section 54 has a configuration the same as that of the supporting section 53, components of the supporting section 54 are denoted by the same numbers assigned to corresponding components of the supporting section 53, and therefore description of the section 54 is omitted.

The rotating body 52 includes the shaft 65 (an example of a shaft), a first arm 67 (an example of a first arm portion), a second arm 71 (an example of a second arm portion), and a third arm 75 (an example of a third arm portion), these arms extending from the center of the shaft 65 in a direction perpendicular to the shaft 65. The rotating body 52 is disposed between the supporting sections 53 and 54. The shaft 65 of the rotating body 52 is supported by the supporting portion 58 of each of the supporting sections 53 and 54. Specifically, the shaft 65 is inserted into the slot 57 of the supporting portion 58. The shaft 65 extends through the slot 57, and one end 65A of the shaft 65 protrudes leftward from the supporting section 53, and another end 65B of the shaft 65 protrudes rightward from the supporting section 54 (see, FIG. 3B).

The shaft 65 has a cross-sectional surface formed in a substantially oval shape. Specifically, a circumferential surface of a round bar is partially cut into a planar shape to produce the shaft 65 having a pair of parallel surfaces on the circumferential surface. Accordingly, the cross sectional surface of the shaft 65 has a larger width and a smaller width. A round groove 57A (an example of a round hole) is formed on the upper end of the slot 57. An inside diameter of the round groove 57A is configured so as to be larger than the larger width of the cross sectional surface of the shaft 65, so that the shaft 65 is rotatably supported by the round groove 57A. The slot 57 includes the round groove 57A and a narrow portion 57B extending from the round groove 57A to the lower end of the slot 57. The narrow portion 57B (an example of a oblong hole) is formed so as to have a width narrower than the inside diameter of the round groove 57A, and specifically the narrow portion 57B has a width narrower than the larger width of the cross sectional surface of the shaft 65 but wider than the smaller width thereof.

Because the shaft 65 and the slot 57 are formed as described above, the supporting portion 58 enables the rotating body 52 to be rotated about the shaft 65 when the shaft 65 is positioned in the round groove 57A as indicated by an unbroken line in FIG. 3A. In cases where the rotating body 52 is in a reference position (corresponding to a reference position) indicated by the unbroken line in FIG. 3A, the shaft 65 is capable of sliding in the slot 57 in the vertical direction 7. Namely, in the shaft 65 of the rotating body 52, a portion supported by the slot 57 is formed in a shape which enables the shaft 65 to move from the round groove 57A to the narrow portion 57B when the rotating body 52 is in the reference position. Because the width of the narrow portion 57B is smaller than the larger width of the cross sectional surface of the shaft 65, the shaft 65 that has entered the narrow portion 57B is incapable of being rotated. Namely, in a state in which the shaft 65 is positioned in the narrow portion 57B, the rotation of the rotating body 52 to a first position (described hereinafter and corresponding to a first position) is restricted (prohibited), and the reference position is therefore held. In other words, in the shaft 65 of the rotating body 52, a portion to be supported by the slot 57 is formed in a shape which enables positional change to the first position to be restricted when the shaft 65 has entered the narrow portion 57B. In cases where the shaft 65 is positioned in the round groove 57A and where the rotating body 52 is in the first position, the shift of the shaft 65 from the round groove 57A to the narrow portion 57B is restricted (prohibited).

The term "reference position" means a state in which the rotating body 52 is not engaged with any of the document cover 17 and the printer housing 14 and means a state in which the shaft 65 is positioned in the round groove 57A and in which a second arm 71 vertically extends upward from the shaft 65. The shaft 65 is formed such that the larger width of the cross sectional surface thereof is aligned with a longitudinal direction of the slot 57 in cases where the rotating body 52 is in the reference position. Accordingly, in cases where the rotating body 52 is in the reference position, the shaft 65 is capable of entering the narrow portion 57B, and therefore the rotating body 52 is capable of sliding in the vertical direction 7 within the narrow portion 57B. Furthermore, because each of the shaft 65 and the slot 57 is formed so as to have the size described above, the shaft 65 that has entered the narrow portion 57B is incapable of being rotated.

The slot 57 extends in a vertical direction. In cases where an external force is not applied to the rotating body 52, the rotating body 52 is exposed to a downward force F2 from its own weight. Accordingly, in cases where the shaft 65 enters the narrow portion 57B in such a state, the rotating body 52 begins to move downward along the narrow portion 57B. Then, the shaft 65 reaches the lower end of the narrow portion 57B, and the rotating body 52 takes a second position (corresponding to a second position) indicated by a dashed line in FIG. 3A. The rotating body 52 may be biased downward from the reference position not only by its own weight but by using a biasing member such as a spring.

A first hook 68 (an example of a first hook) that is engaged with the printer housing 14 is formed at the leading end of the first arm 67. The first hook 68 is configured so as to be able to be engaged with an engagement member 34 formed on the printer housing 14. The first arm 67 and the first hook 68 form a first engagement portion. An opening 80 into which the first arm 67 and the first hook 68 are capable of being inserted is formed on the lower wall 15A of the scanner housing 15. An opening (not illustrated) into which the first arm 67 and the first hook 68 are capable of being inserted is formed on the upper wall 14B of the printer housing 14. The first arm 67 and the first hook 68 protrude downward from the opening 80. The engagement member 34 is disposed on the upper wall 14B of the printer housing 14 and protrudes downward from the upper wall 14B. In the embodiment, in cases where the scanner housing 15 is in the closed position and where the rotating body 52 is in the first position described hereinafter, the first hook 68 that has entered the printer housing 14 from the opening on the upper wall 14B is engaged with the engagement member 34 to lock the scanner housing 15 to the printer housing 14 in the vertical direction 7. The first hook 68 and the engagement member 34 may appropriately employ any configuration in so far as they are capable of engaging with each other.

A second hook 72 (an example of a second hook) is formed at the leading end of the second arm 71. The second arm 71 and the second hook 72 form a second engagement portion. The second hook 72 is configured to be engaged with the document cover 17. Specifically, the second hook 72 is formed so as to be able to be engaged with an engagement arm 36 (an example of an engagement arm) disposed on the document cover 17. The engagement arm 36 includes an arm 37 extending downward from a lower wall 17A of the document cover 17 in an oblique direction toward the front side and includes a hook 38 extending backward from the vicinity of the leading end of the arm 37 in a horizontal direction. An opening 81 (see, FIG. 3B) is formed in the upper wall 15B of the scanner housing 15 at a position corresponding to the engagement arm 36. During a process in which the document cover 17 shifts from the opened position to the closed position to cover the upper surface of the scanner housing 15, the leading end 39 and the hook 38 of the engagement arm 36 enter the scanner housing 15 through the opening 81. The second hook 72 is configured so as to be able to be engaged with the hook 38 that has entered the scanner housing 15. In the embodiment, in cases where the rotating body 52 is in the second position (position indicated by a dashed line in FIG. 3A), the second hook 72 is engaged with the engagement arm 36, so that the scanner housing 15 is locked to the document cover 17. The second hook 72 and the engagement arm 36 may appropriately employ any configuration in so far as they are capable of engaging with each other.

With reference to FIG. 4A, a pair of supporting members 86 (an example of a second return mechanism, a bearing) are formed on the printer housing 14. The supporting members 86 protrude upward from the upper wall 14B of the printer housing 14. Openings 88 (see, FIG. 3B) are formed on the lower wall 15A of the scanner housing 15 at positions corresponding to the two ends of the shaft 65. In cases where the scanner housing 15 is in the opened position, the rotating body 52 is in the second position. During a process in which the scanner housing 15 shifts from the opened position to the closed position to cover the upper surface of the printer housing 14, the supporting members 86 enter the scanner housing 15 through the openings 88, and then the upper ends 87 of the supporting members 86 push up the two ends of the shaft 65 against the downward force F2 (see, FIGS. 5A and 5B). Then, in cases where the scanner housing 15 is in the closed position, the upper ends 87 help the shaft 65 to be positioned at the round groove 57A of the slot 57, so that the rotating body 52 is held in the reference position.

In the embodiment, in cases where the rotating body 52 is in the reference position indicated by the unbroken line in FIG. 3A, the second arm 71 vertically extends upward, and the first arm 68 extends in a direction in which the first arm 68 is tilted backward at an angle θ with respect to a vertical direction. Weight balancing or the like is configured in each of the first arm 68, the second arm 71, and the third arm 75 such that the rotating body 52 is rotated in the anticlockwise direction in FIG. 3A by being exposed to force F1 when force other than the gravity does not act on the rotating body 52. Conditions for rotating the rotating body 52 in the anticlockwise direction by exposing the rotating body 52 to the force F1 in this manner (a length, shape, weight, and mounting angle in each of the arms) are appropriately configured depending on each component of the locking mechanism 50. The rotating body 52 may be biased in the anticlockwise direction from the reference position not only by its own weight but by using a biasing member such as a spring.

The third arm 75 extends forward from the shaft 65 in a horizontal direction while the rotating body 52 is in the reference state. In cases where the document cover 17 is in the opened position, the rotating body 52 is exposed to the force F1 with the result that the rotating body 52 is rotated in the anticlockwise direction to take a first position illustrated in FIG. 7. During a process in which the document cover 17 shifts from the opened position to the closed position to cover the upper surface of the scanner housing 15, the leading end 39 of the engagement arm 36, which has entered the scanner housing 15, downward presses the third arm 75. The leading end 39 downward presses the third arm 75, and then the rotating body 52 counteracts the force F1 in the anticlockwise direction, and thereby being rotated in a clockwise direction. Then, the document cover 17 is in the closed position, the rotating body 52 returns to the reference position, and thereby holding the reference position. In the embodiment, the third arm 75 and the leading end 39 of the engagement arm 36 form a first return mechanism.

[Opening and Closing Operation of the Document Cover 17 and Operation of the Locking Mechanism 50]

The opening and closing operations of the document cover 17 and the operation of the locking mechanism 50 associated therewith will be hereinafter described with reference to FIGS. 5A to 8.

FIGS. 5A and 5B illustrate the scanner housing 15 and the document cover 17, both being in the closed position. In this case, the shaft 65 of the rotating body 52 is held by the supporting members 86 at the round groove 57A, and therefore the rotating body 52 is not engaged with any of the printer housing 14 and the document cover 17 to take the reference position. Namely, as illustrated in FIG. 5B, in the reference position, the first hook 68 of the first arm 67 is not engaged with the engagement member 34, and the second hook 72 of the second arm 71 is not also engaged with the hook 38 of the engagement arm 36. As illustrated in FIG. 5B, in the reference position of the rotating body 52, the second hook 72 and the hook 38 overlap with each other in the longitudinal direction 8 in a plan view but are spaced apart from each other in the vertical direction 7 as viewed from a lateral side.

Figure 6B:
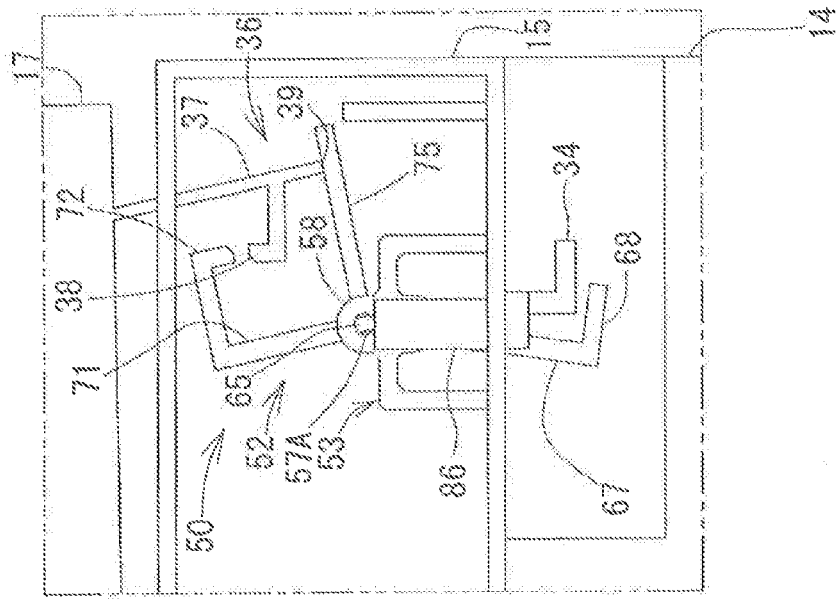
FIG. 6B is a cross-sectional view schematically illustrating the locking mechanism under the operation in which the document cover is being opened.
Figure 6A:
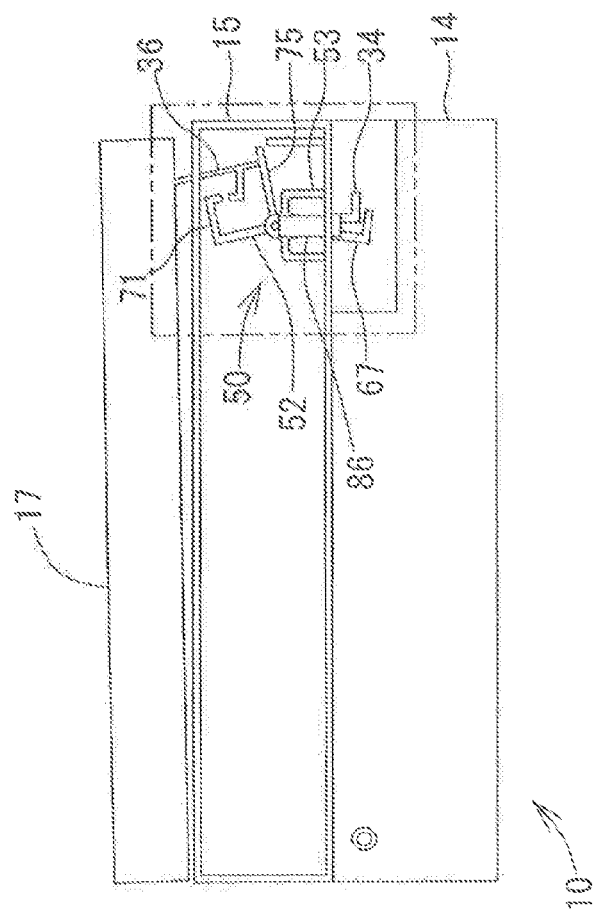
FIG. 6A is a cross-sectional view schematically illustrating the locking mechanism under the operation in which the document cover is being opened.

With reference to FIGS. 6A and 6B, in cases where the document cover 17 is raised to be rotated from the closed position to the opened position, the engagement arm 36 also moves upward. In this case, because the third arm 75 is released from being pressed downward by the engagement arm 36, the rotating body 52 is rotated in the anticlockwise direction by the action of the force F1 (see, FIG. 3A). The upward movement of the engagement arm 36 leads to the hook 38 approaching the second hook 72, whereas at the same time the second hook 72 moves away backward due to the rotation of the rotating body 52 in the anticlockwise direction. Accordingly, in cases where the document cover 17 is rotated to the opened position, the second hook 72 is not engaged with the hook 38. In other words, during a process in which the document cover 17 shifts to the opened position, the second hook 72 and the hook 38 maintain a state in which they are not engaged with each other (engagement released state), and accordingly the document cover 17 and the scanner housing 15 maintain an unlocked state.

Figure 7B:
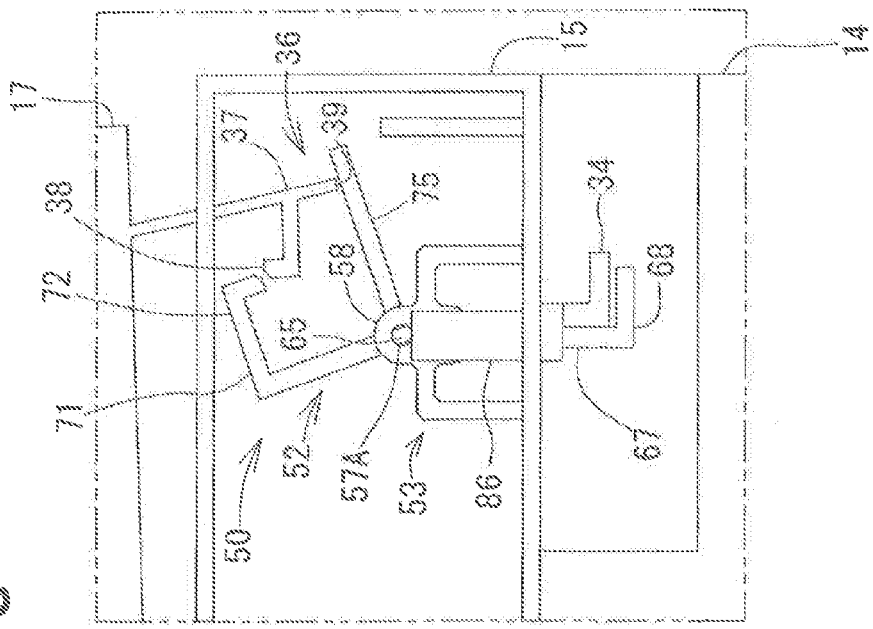
FIG. 7B is a cross-sectional view schematically illustrating the locking mechanism under the operation in which the document cover is being opened.
Figure 7A:
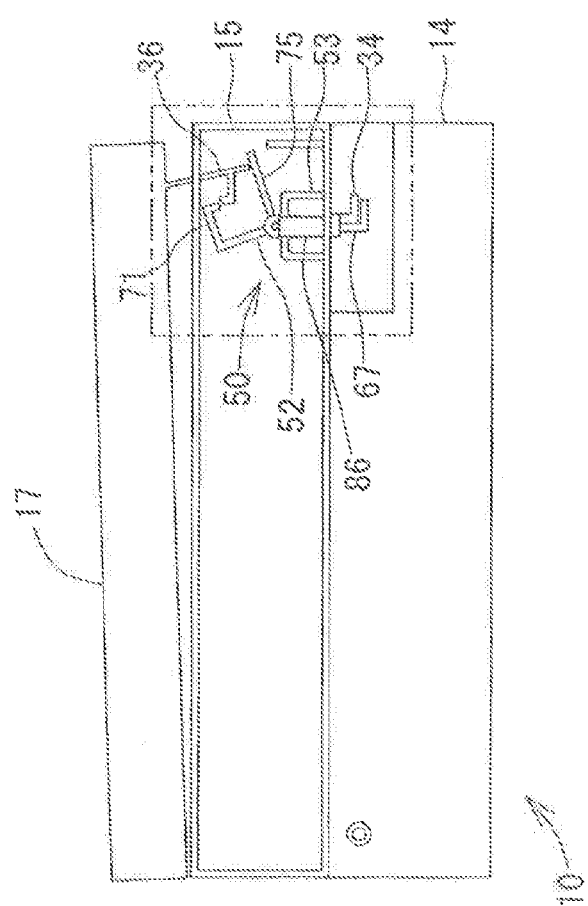
FIG. 7A is a cross-sectional view schematically illustrating the locking mechanism under the operation in which the document cover is being opened.

In cases where the document cover 17 is further raised as illustrated in FIGS. 7A and 7B, the rotating body 52 is further rotated in the anticlockwise direction. In this rotational process, the first hook 68 of the first arm 67 is engaged with the engagement member 34 (see, FIG. 7B). In cases where the first hook 68 is engaged with the engagement member 34, the first arm 67 abuts on the engagement member 34, so that the rotation of the rotating body 52 stops. A position of the rotating body 52 at this time is the first position. In other words, in the first position, the first hook 68 is engaged with the engagement member 34, and the second hook 72 and the hook 38 maintain the engagement released state. In the embodiment, because the rotating body 52 is exposed to the force F1 in the anticlockwise direction, the rotating body 52 is held in the first position.

Because the locking mechanism 50 acts as described above, the scanner housing 15 is locked to the printer housing 14 even if the document cover 17 is fully opened backward as illustrated in FIG. 8, so that the scanner housing 15 does not open while the document cover 17 is open. Namely, the document cover 17 and the scanner housing 15 do not open at the same time.

Opening and Closing Operations of the Scanner Housing 15 and Operation of the Locking Mechanism 50

The opening and closing operations of the scanner housing 15 and the operation of the locking mechanism 50 associated therewith will be hereinafter described with reference to FIGS. 9A to 12.

Figure 9B:
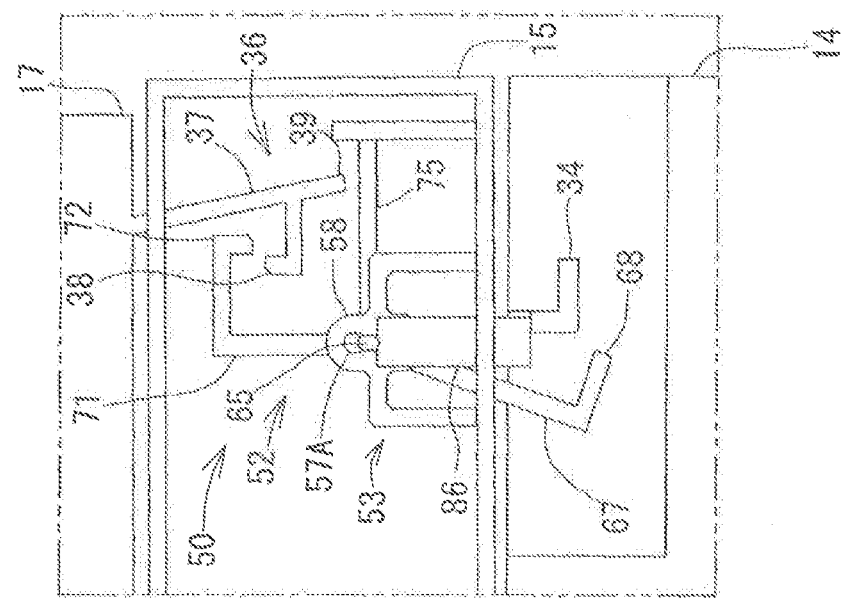
FIG. 9B is a cross-sectional view schematically illustrating the locking mechanism under the operation in which the scanner housing is being opened.
Figure 9A:
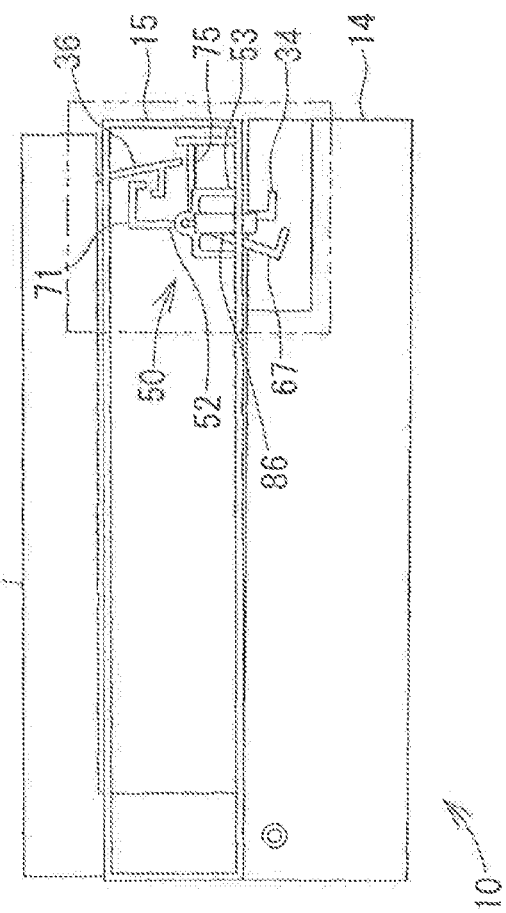
FIG. 9A is a cross-sectional view schematically illustrating the locking mechanism under the operation in which a scanner housing is being opened.

In cases where the scanner housing 15 is raised to be rotated from the closed position to the opened position in a state in which both of the scanner housing 15 and the document cover 17 are in the closed position as illustrated in FIGS. 5A and 5B, the scanner housing 15 is spaced apart from the printer housing 14 as illustrated in FIGS. 9A and 9B. Accordingly, the round groove 57A gradually moves away upward from the leading end 87 of the supporting member 86. In this case, because the rotating body 52 is exposed to the downward force F2 from its own weight, the shaft 65 begins to move from the round groove 57A of the slot 57 to the narrow portion 57B. Namely, the rotating body 52 relatively moves downward with respect to the scanner housing 15. In cases where the rotating body 52 moves downward, because the third arm 75 moves away from the leading end 39 of the arm 36, the third arm 75 is released from being pressed by the leading end 39. Although the rotating body 52 is exposed to the force F1, the shaft 65 which has a cross sectional configuration formed in a substantially oval shape enters the narrow portion 57B as described above, so that the rotation in the anticlockwise direction is restricted. In other words, the shaft 65 and the narrow portion 57B restrict the rotation of the rotating body 52 in the anticlockwise direction. Accordingly, in cases where the scanner housing 15 is rotated to the opened position, the first hook 68 is not engaged with the engagement member 34. Namely, during a process in which the scanner housing 15 shifts to the opened position, the first hook 68 and the engagement member 34 maintain a state in which they are not engaged with each other (engagement released state), and accordingly the scanner housing 15 and the printer housing 14 maintain an unlocked state. In order that the shaft 65 smoothly moves from the round groove 57A to the narrow portion 57B, each component may be designed such that the force F1 comes to be larger than the force F2.

With reference to FIGS. 10A and 10B, the rotating body 52 moves downward, and then the second hook 72 approaches the hook 38. Then, with reference to FIGS. 11A and 11B, in cases where the slot 57 completely departs from the supporting member 86 and where the shaft 65 is then supported at the lower end of the narrow portion 57B, the second hook 72 is engaged with the hook 38. A position in which the second hook 72 is engaged with the hook 38 in this manner is the second position. In other words, in the second position, the second hook 72 is engaged with the hook 38, and the first hook 68 and the engagement member 34 maintain the engagement released state.

Because the locking mechanism 50 acts as described above, the document cover 17 is locked to the scanner housing 15 even if the scanner housing 15 is fully opened backward as illustrated in FIG. 12, so that the document cover 17 does not open while the scanner housing 15 is open. Namely, the document cover 17 and the scanner housing 15 do not open at the same time.

In the embodiment, the third arm and the engagement arm are used as the first return mechanism, but, alternatively, an arm may be provided on the document cover to directly press the second arm.

Furthermore, in the embodiment, the supporting member is used as a second return mechanism, but, alternatively, a protrusion may be provided on the first arm or the second arm such that the rotating body may be pushed up by contacting the protrusion.

Furthermore, in the embodiment, the printer housing is disposed on a part of the body, but, alternatively, another housing having other function may be disposed in place of the printer housing.

[Effects and Advantages of the Embodiments]

As described above, in the embodiment, each of the document cover 17 and the scanner housing 15 is incapable of separately taking the opened position at the same time by virtue of the locking mechanism 50. In other words, in cases where any one of the document cover 17 and the scanner housing 15 is in the opened position, the other is locked in the closed position. In the related art, the document cover 17 and the scanner housing 15 simultaneously open to cause the multifunctional apparatus 10 to fall, leading to damages or breakdowns of the apparatus 10, but such problems are overcome. Accordingly, the safety of the multifunctional apparatus 10 is capable of being increased. Furthermore, the locking mechanism 50 of the embodiment is achieved by the one rotating body 52, leading to reduced number of components. Consequently, the locking mechanism 50 is capable of being formed in a smaller size, attributing the downsizing of the multifunctional apparatus 10.

What is claimed is:

1. A multi-function apparatus comprising:
   a body;
   an image reading unit which has a document placing surface and which is configured to read an image of a document placed on the document placing surface, the image reading unit being movable between a closed position to cover an upper portion of the body and an opened position to open the upper portion;
   a document cover movable between a closed position to cover the document placing surface and an opened position to open the document placing surface;
   a first engagement portion configured to prevent the image reading unit from moving from the closed position to the opened position by engaging with the body;
   a second engagement portion configured to interlock with the first engagement portion and to prevent the document cover from moving from the closed position to the opened position by engaging with the document cover; and
   a support member configured to support the second engagement portion such that the second engagement portion is movable upward and downward and is pivotable,
   wherein the first engagement portion, second engagement portion and the support member are configured such that:
   in response to a movement of the document cover to the opened position, the first engagement portion engages with the body and locks the image reading unit to the closed position; and
   in response to a movement of the image reading unit to the opened position, the second engagement portion engages with the document cover and locks the document cover to the closed position.

2. The multi-function apparatus according to claim 1, wherein the first engagement portion and second engagement portion are integrally formed.

3. The multi-function apparatus according to claim 1, wherein the first engagement portion and second engagement portion are relatively fixed.

4. The multi-function apparatus according to claim 1, wherein the first engagement portion, second engagement portion and the support member are configured such that:
   in response to the movement of the image reading unit to the opened position, the second engagement portion moves downward; and
   in response to the movement of the image reading unit to the closed position, the second engagement portion moves upward.

5. The multi-function apparatus according to claim 1, wherein when both of the document cover and the image reading unit are in the closed position, both of the first engagement portion and the second engagement portion are disengaged.

6. The multi-function apparatus according to claim 1, wherein
   the first engagement portion comprises a first arm portion and a first hook portion, and
   the second engagement portion comprises a second arm portion and a second hook portion.

7. The multi-function apparatus according to claim 6, wherein the first arm portion and the second arm portion make a predetermined angle.

8. The multi-function apparatus according to claim 7, wherein the predetermined angle is fixed.

9. The multi-function apparatus according to claim 1, wherein the image reading unit is pivotable about a first axis, and the first engagement portion and second engagement portion are disposed at a distal end side of the image reading unit with respect to the first axis.

10. The multi-function apparatus according to claim 1, wherein the support member comprises a guide portion configured to allow the second engagement portion to move upward and downward in a predetermined range.

11. The multi-function apparatus according to claim 10, wherein the guide portion has a groove for guiding the second engagement portion.

12. The multi-function apparatus according to claim 11, wherein the groove extends vertically.

* * * * *